United States Patent
Lo et al.

(10) Patent No.: US 12,488,168 B2
(45) Date of Patent: Dec. 2, 2025

(54) CIRCUIT VERIFICATION METHOD

(71) Applicant: Realtek Semiconductor Corporation, Hsinchu (TW)

(72) Inventors: I-Hsiu Lo, Hsinchu (TW); Yung-Jen Chen, Hsinchu (TW); Yu-Lan Lo, Hsinchu (TW); Shu-Yi Kao, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 599 days.

(21) Appl. No.: 18/059,961

(22) Filed: Nov. 29, 2022

(65) Prior Publication Data
US 2023/0334209 A1    Oct. 19, 2023

(30) Foreign Application Priority Data
Apr. 13, 2022    (TW) .................................. 111114125

(51) Int. Cl.
*G06F 30/33* (2020.01)
*G06F 30/20* (2020.01)
*G06F 30/3308* (2020.01)
*G06F 30/3323* (2020.01)
*G06F 30/367* (2020.01)
*G06F 30/398* (2020.01)
*G06F 119/02* (2020.01)

(52) U.S. Cl.
CPC .......... *G06F 30/33* (2020.01); *G06F 30/3323* (2020.01); *G06F 30/20* (2020.01); *G06F 30/3308* (2020.01); *G06F 30/367* (2020.01); *G06F 30/398* (2020.01); *G06F 2119/02* (2020.01)

(58) Field of Classification Search
CPC ...... G06F 30/33; G06F 30/20; G06F 30/3323; G06F 30/3308; G06F 30/367; G06F 30/398
USPC .................... 716/106, 112, 113, 136; 703/16
See application file for complete search history.

(56) References Cited

U.S. PATENT DOCUMENTS

| 10,566,161 B2 * | 2/2020 | Zotter ................. H01H 47/002 |
| 2001/0014922 A1 * | 8/2001 | Kuge ................. G06F 13/4239 710/36 |

(Continued)

FOREIGN PATENT DOCUMENTS

| JP | 2001014371 A | * | 1/2001 | ............ G06F 30/30 |
| TW | 202034454 A | | 9/2020 | |
| TW | 202117574 A | | 5/2021 | |

*Primary Examiner* — Phallaka Kik
(74) *Attorney, Agent, or Firm* — CKC & Partners Co., LLC

(57) ABSTRACT

A circuit verification method, including the following steps: inputting a circuit design data to a processor, wherein the circuit design data includes a plurality of logic circuits and a plurality of detection nodes, each logic circuit includes a control terminal and a plurality of input terminals, and is configured to output a signal to the detection node; inputting a plurality of first-stage property command to the processor to generate a plurality of first-stage formal commands, and the first-stage formal commands are configured to verify whether signals of the detection nodes remain stable when a signals of the control terminal of each of the logic circuits does not changed; finding a first part of the detection nodes by a formal method according to the first-stage formal commands; and finding a second part of the detection nodes by a formal method.

20 Claims, 4 Drawing Sheets

(56) References Cited

U.S. PATENT DOCUMENTS

| | | | |
|---|---|---|---|
| 2012/0089957 A1* | 4/2012 | Yoshizawa | G06F 30/327 |
| | | | 716/106 |
| 2012/0198399 A1* | 8/2012 | Safarpour | G06F 30/3323 |
| | | | 716/106 |
| 2014/0129851 A1* | 5/2014 | Hung | G06F 1/26 |
| | | | 713/300 |
| 2018/0341724 A1* | 11/2018 | Sugahara | G06F 30/3312 |
| 2019/0045660 A1* | 2/2019 | Hsu | G06F 1/206 |
| 2019/0340144 A1* | 11/2019 | Li | G06F 13/4072 |
| 2023/0367736 A1* | 11/2023 | Zhou | G06F 13/4081 |
| 2023/0418719 A1* | 12/2023 | Wang | G06F 11/2733 |

* cited by examiner

CIRCUIT VERIFICATION METHOD

CROSS-REFERENCE TO RELATED APPLICATION

This application claims priority to Taiwan Application Serial Number 111114125, filed Apr. 13, 2022, which is herein incorporated by reference in its entirety.

BACKGROUND

Technical Field

The present disclosure relates to a method for detecting signal of each node of a circuit, especially for verifying the stability of the circuit.

Description of Related Art

One goal of circuit design is to make signals of nodes between multiple logic circuits in a circuit chip can be controlled well by registers (REG). However, nodes in circuits do not necessarily connect directly to the registers. To ensure that nodes are controlled by registers, the logic circuit corresponding to each nodes must be detected, but the calculation of this method is too large and needs to be improved.

SUMMARY

One aspect of the present disclosure is a circuit verification method, comprising: inputting a circuit design data to a processor, wherein the circuit design data comprises a plurality of logic circuits and a plurality of detection nodes, each of the plurality of logic circuit includes a control terminal and a plurality of input terminals, and is configured to output a signal to one of the plurality of detection nodes; inputting a plurality of first-stage property commands to the processor to generate a plurality of first-stage formal commands conforming a formal method, wherein the plurality of first-stage property commands corresponds to the plurality of detection nodes, and is configured to verify whether signals of the plurality of detection nodes remain stable when a signal of the control terminal of each of the plurality of logic circuits does not changed; finding a first part of the plurality of detection nodes by the formal method according to the first-stage formal commands; and finding a second part of the plurality of detection nodes by the formal method, wherein the second part comprises a part of the plurality of detection nodes with signal changes when signals of the control terminal and a first input terminal of the plurality of input terminals do not change.

Another aspect of the present disclosure is a circuit verification method, comprising: inputting a circuit design data to a processor, wherein the circuit design data comprises a plurality of logic circuits and a plurality of detection nodes, each of the plurality of logic circuit includes a control terminal and a plurality of input terminals, and is configured to output a signal to one of the plurality of detection nodes; using, by the processor, a formal method to find a plurality of stuck nodes of the plurality of detection nodes where signals remains constant; and using, by the processor, the formal method to find a first part of the plurality of detection nodes, wherein the first part comprises a part of the plurality of detection nodes with signal changes when a signal of the control terminal does not change.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
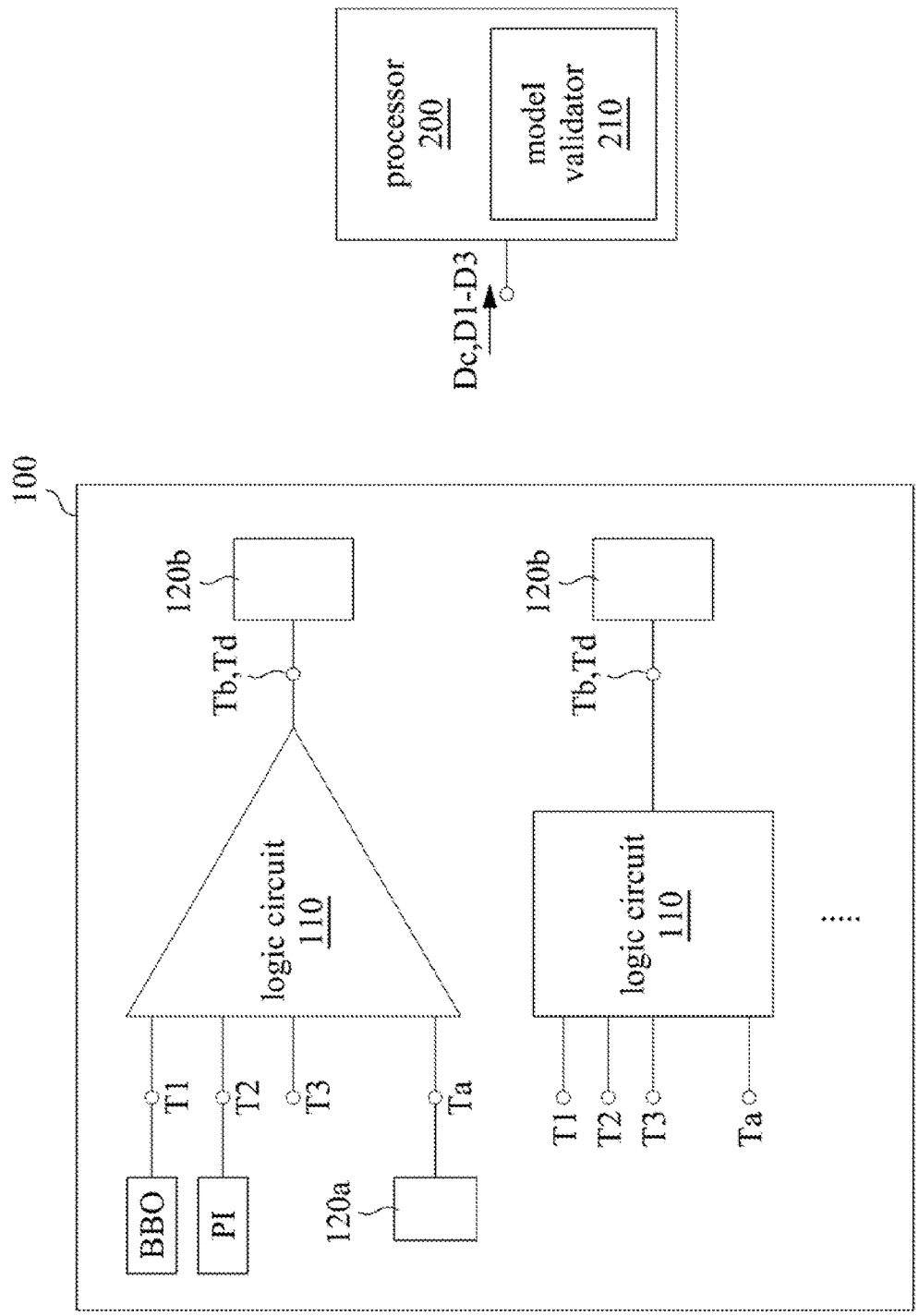
FIG. 1 is a schematic diagram of a circuit to be identified in some embodiments of the present disclosure.

The present disclosure relates to a circuit verification method, which is applied to detect the stability or controllability of each node in a circuit. FIG. 1 is a schematic diagram of a circuit to be identified 100 and a processor 200 in some embodiments of the present disclosure. The circuit to be identified 100 includes multiple logic circuits 110 and multiple corresponding detection nodes Td. The logic circuits 110 may be a combinational logic fan-in cone (CLFC), but not limited to this. In some embodiments, the circuit to be identified 100 is a memory circuit, such as Static Random Access Memory (SRAM). In other words, each of logic circuits 110 is respectively a part of the memory circuit.

As shown in FIG. 1, each logic circuits 110 includes a control terminal Ta and multiple input terminals T1-T3, and an output terminal Tb of each logic circuits 110 coupled to the detection nodes Td. In other words, the logic circuits 110 is configured to output signal to the corresponding detection nodes Td. In addition, the logic circuits 110 connects to multiple register circuits 120a, 120b through the control terminal Ta and the detection nodes Td. The logic circuits 110 do not include any register elements (e.g., registers, flip-flop, latch, which is configured to store the input signal according to the clock signal, and selectively adjusts the output signal in the next clock signal according to the change of the current clock signal.) Circuits connect to the control terminal Ta and the input terminals T1-T3 of the logic circuits 110 will be explained in the following paragraphs.

The processor 200 is configured to verify the circuit to be identified 100. The detection nodes Td in the logic circuits 110 and in the circuit to be identified 100 can be organized as a circuit design data to input to the processor 200. The circuit design data may be an interface logic model netlist (ILM netlist) or a gate-level netlist. The processor 200 uses "Formal method" to analyze and verify the circuit design data Dc to determine the controllability of the detection nodes Td. In some embodiments, the processor 200 includes a model validator 210 that is configured to convert the circuit design data Dc into a formal circuit model conforming to the specification of the formal method.

The core of formal method is model-checking (property-checking). The basic principle is to convert the "engineering hypothesis" to be verified into a mathematical proposition, and then use a variety of built-in algorithms to prove the authenticity of the mathematical proposition. Compared with circuit simulation, circuit simulation must input a specific signal pattern to the circuit to be identified to test whether the corresponding output result of each signal pattern is correct one by one. However, because the logic circuits 110 have too many possible situations, it is difficult for circuit simulation technology to achieve complete coverage under limited time and computing resources.

The present disclosure converts verification questions (i.e., the controllability of the detection nodes Td) into a format that can be handled by the formal method. After the circuit design data Dc is input to the processor 200, the processor 200 converts the circuit design data Dc into the formal circuit model. Next, inputing multiple first-stage property commands D1, the processor 200 generates multiple first-stage formal commands conforming the formal method according to the first-stage property commands D1. "The first-stage property commands D1" correspond to the detection nodes Td of the circuit to be identified 100, each of the first-stage property commands D1 is configured to verify "when signal of the control terminal Ta of one logic circuit 110 does not changed, whether signals of the corresponding detection nodes remain stable." In some embodiments, the processor 200 uses the SVA (System Verilog Assertion) syntax to generate the first-stage formal commands, as follows:

assert ##1 $stable(node)
assume ##1 $stable(All CLFC REGO)

As mentioned above, according to the first-stage formal commands, the processor 200 validates the formal circuit model by the formal method through the model validator 210, so as to find "when the signal of the control terminal Ta does not change, a part of detection nodes where signals remains stable" and find "when the signal of the control terminal Ta does not change, a part of detection nodes where signals cannot remain stable" (hereinafter referred to as "first part"). The aforementioned verification steps are referred to herein as "verification stability".

Figure 2:
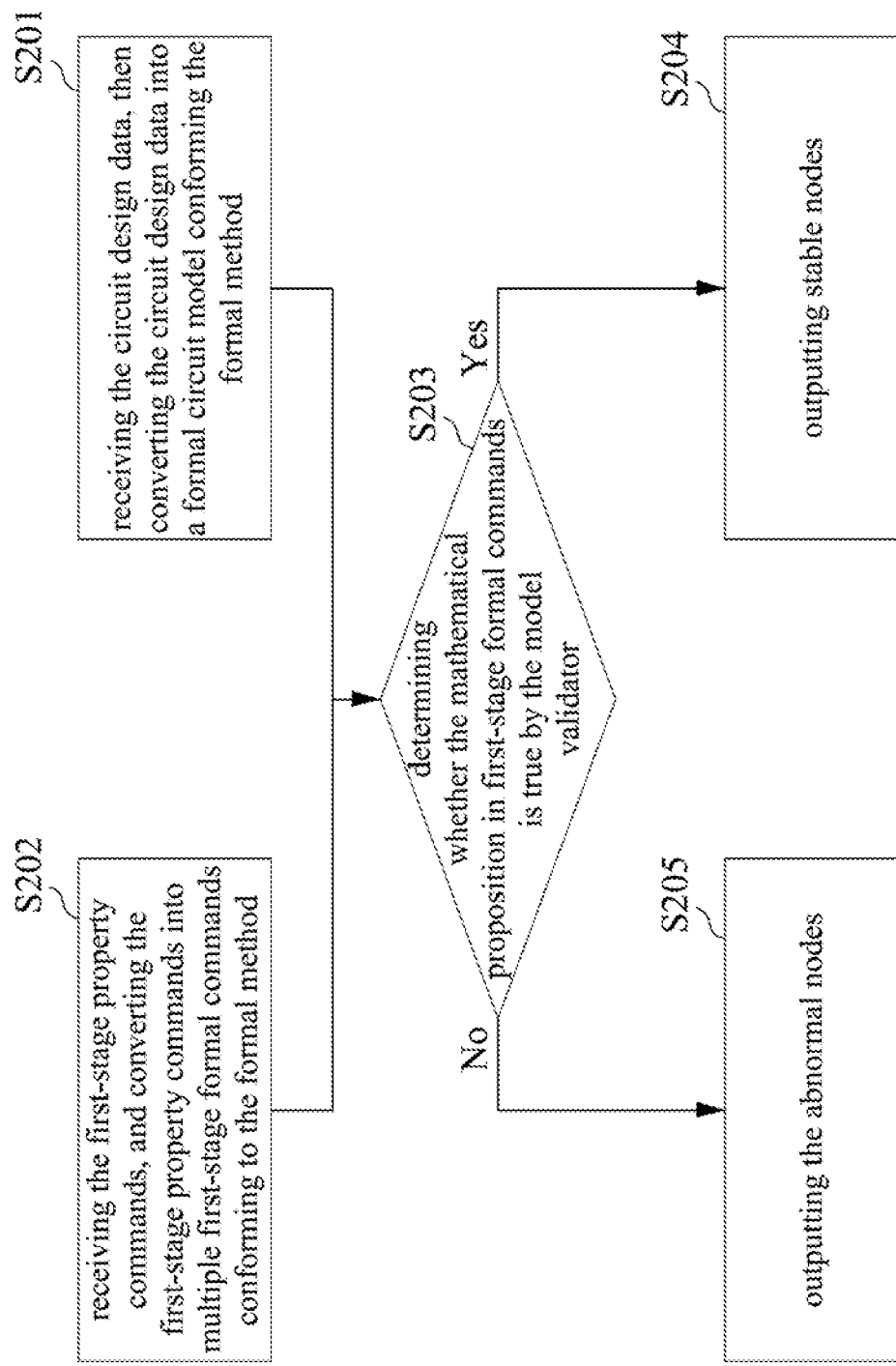
FIG. 2 is a flowchart illustrating a formal method in some embodiments of the present disclosure.

FIG. 2 is a flowchart illustrating a formal method performing by the processor 200 in some embodiments of the present disclosure. In step S201, the processor 200 first receives the circuit design data, then convert the circuit design data into a formal circuit model conforming the formal method. The formal circuit model can be a finite state model. In step S202, the processor 200 receives the first-stage property commands D1, and converts the first-stage property commands D1 into multiple first-stage formal commands conforming to the formal method. The first-stage formal commands can be a temporal logic.

In step S203, the processor 200 inputs the formal circuit model and the first-stage formal commands to the model validator 210, so as to determine whether the mathematical proposition in the first-stage formal commands D1 is true by the model validator 210. As mentioned above, the first-stage property commands D1 is configured to verify "when the signal of the control terminal Ta of the logic circuits 110 does not change, whether the signal of the corresponding detection nodes Td (i.e., the output terminal Tb of the logic circuits 110) remains stable". Therefore, detection nodes that are determined to be true in step S203 are stable nodes. In step S204, the processor 200 will output stable nodes. On the other hand, detection nodes that are determined to be false in step S203 are an abnormal nodes. In step S205, the processor 200 outputs the abnormal nodes, so that the operator can adjust the circuit to be identified, or perform further verification.

In this embodiment, the signal of the detection node Td should only be controlled by the corresponding control terminal Ta. In other words, if the signal of the control terminal Ta does not change, the signal of the corresponding detection node Td should also remain unchanged, especially not to change with the influence of signals of other input terminals T1-T3. Therefore, after the processor 200 verifies and finds out a part of detection nodes Td cannot remain stable when the signal of corresponding control terminal Ta does not changed, it means that these detection nodes Td are unstable and have no controllability. According to the detection nodes Td, the logic circuits 110 or the corresponding circuit design data Dc can be readjusted.

Accordingly, by inputting the verification question in a form that the formal method can handle (i.e., the first-stage property commands D1) without testing the output changes of each signal one by one as in the circuit simulation, which effectively reduces the calculation required for verifying a circuit. In addition, in the case that the circuit to be identified 100 includes a huge number of the logic circuits 110 and the detection nodes Td, the verification method of the present disclosure can effectively improve the verification efficiency, and quickly find the logic circuits 110 that need to be corrected and adjusted.

In addition, in one embodiment, in addition to "verification stability", the circuit verification method further verifies whether the signal of each of the detection nodes Td remains constant, this is referred to as "non-stuck-at check". If the signal of the detection node Td remains constant, it means that even if the signal of the corresponding control terminal Ta changes, the signal of the detection node Td will not change, and this state still means that the logic circuits 110 are abnormal. Therefore, the processor 200 uses the formal method to find multiple stuck nodes in the detection nodes Td whose signals always are constant. The found stuck nodes are configured to adjust the logic circuits 110 or the corresponding circuit design data Dc.

The circuit details and the steps of the circuit verification method are described below. Referring to FIG. 1, in one embodiment, multiple input terminals T1-T3 of each logic circuits 110 can be divided into the following three types according to the kind of external circuit it is connected to:

(1) The first input terminal T1: connecting to the black box output circuit BBO. The black box output circuit BBO is defined as a circuit module that has not been defined in the circuit design data Dc, so the internal circuit of the black box output circuit BBO cannot be confirmed.

(2) The second input terminal T2: connecting to the primary input circuit PI. The primary input circuit PI is a Hierarchy port of the entire circuit, belonging to the outermost of the circuit structure of the circuit to be identified 100.

(3) The third input terminal T3: the third input terminal T3 is a floating node, it represents that the signal is not driven by any circuit, and value of the floating node cannot be predicted or controlled at any time. Therefore, for circuit design, the output terminal signal of the logic circuits 110 should not vary with the floating node, otherwise the node will be seriously unstable.

It is worth mentioning that the first input terminal, the second input terminal and the third input terminal are configured to classify the input terminals connected to different types of external circuits. In other words, the number of the first input terminal, the second input terminal and the third input terminal is not necessarily only one, but may also be more than one. Furthermore, the first input terminal, the second input terminal and the third input terminal are only configured to describe the embodiment shown in FIG. 1, and are not configured to limit the structure or wiring of the logic circuits 110. In other words, in some other embodiments, the first input terminal T1 can be connected to the primary input circuit PI, and the second input terminal T2 can be connected to the black box output circuit BBO. The logic circuits 110 are respectively connected between the other registers (or timing components) through the control terminal Ta and the output terminal Tb, and the logic circuits 110 do not have other registers or timing components. Therefore, during normal operation, the signal of the output terminal Tb will only be controlled by the signal of the control terminal Ta.

Figure 3:
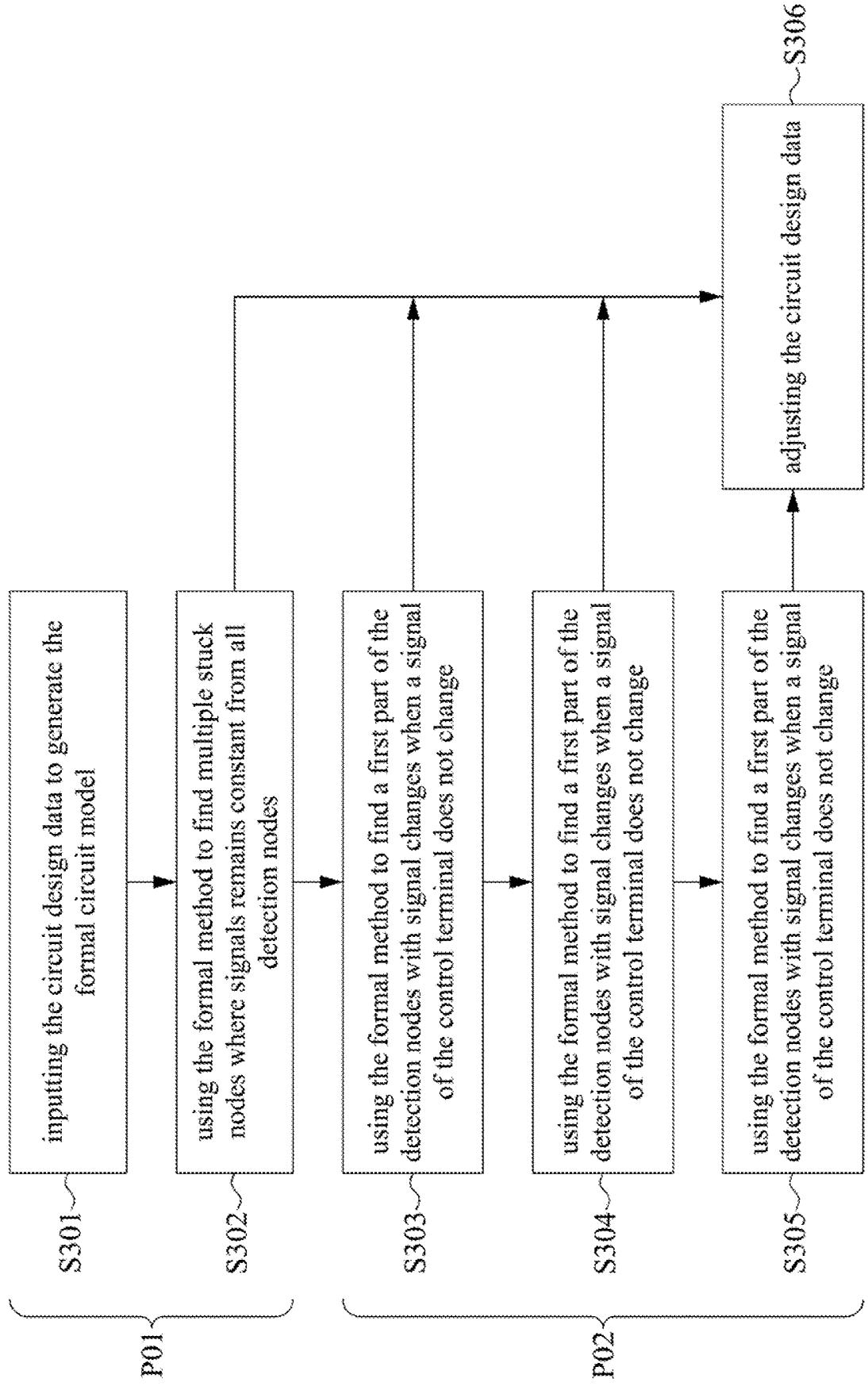
FIG. 3 is a flowchart illustrating a circuit verification method in some embodiments of the present disclosure.

FIG. 3 is a flowchart illustrating a circuit verification method in some embodiments of the present disclosure. Steps S301-302 belong to non-stuck-at check P01, and steps S303-306 belong to verification stability P02. In step S301, inputting the circuit design data Dc to the processor 200 to generate the formal circuit model. In step S302, the processor 200 uses the formal method to find multiple stuck nodes where signals remains constant from all detection nodes Td.

Specifically, when finding the stuck nodes, first inputting multiple non-stuck-at check commands (corresponding to multiple the logic circuits 110 or the detection nodes Td) to the processor 200, and the processor 200 accordingly generates multiple corresponding formal check commands.

These non-stuck-at check commands correspond to the logic circuits 110 or the detection nodes Td, respectively, and are configured to verify whether the signal of each the detection nodes includes at least one signal change. For example, the processor 200 generates formal check commands by using SVA syntax, as follows:

cover ##1 !$stable(node)

As mentioned above, according to the formal check commands conforming to the formal method, the processor 200 finds the stuck nodes with the formal method, and then complete the "non-stuck-at check". At this time, the processor 200 may choose to perform step S306 first, and adjusts the circuit design data Dc according to the stuck nodes.

After completing the "non-stuck-at check", performing to "verification stability". In some embodiments, since the stuck nodes and the corresponding logic circuits 110 have been verified to be abnormal or determined to need adjustment, when performing the subsequent "verification stability", the stuck nodes can be ignored from the detection nodes Td to reduce calculation.

In step S303, the processor 200 uses the formal method to find a first part of the detection nodes. "First part" is a part of detection nodes (i.e., the output terminal Tb in the corresponding logic circuits 110) with signal changes when a signal of the control terminal Ta does not change. The first part of the detection nodes belongs to unstable nodes.

Specifically, when finding the first part of the detection nodes, first inputting multiple first-stage property commands to the processor 200, so as to generate the corresponding multiple first-stage formal commands. Each if the first-stage property commands respectively corresponds to one of the logic circuits 110 or the detection nodes Td, and is configured to verify whether signal of the detection nodes Td remains stable when signal of the control terminal Ta of the logic circuits 110 does not change. Next, according to the first-stage formal commands, the processor 200 uses the formal method to find the first part of the detection nodes. At this time, the processor 200 may choose to perform step S306 first, and adjust the circuit design data Dc according to the first part of the detection nodes.

Since other parts of detection nodes except the first part is already verified that their signals will not be affected by signals other than the control terminal Ta (i.e., belong to stable nodes), when performing subsequent steps, subsequent detections can be performed only for the first part of the detection nodes Td to reduce calculation.

In step S304, the processor 200 uses the formal method to find a second part of the detection nodes Td. "Second part" is a part of detection nodes with signal changes when signals of the control terminal Ta and the first input terminal T1 do not change.

Specifically, when finding the second part of the detection nodes Td, first inputting multiple second-stage property commands D2 to the processor 200 to generate multiple second-stage formal commands. Each second-stage property command D2 corresponds to one logic circuits 110 or one detection node Td, and is configured to verify whether signal of the detection nodes Td remains stable when signal of the control terminal Ta of the logic circuits 110 and signal of the first input terminal T1 (i.e., signal of the black box output circuit) do not change. Next, according to the second-stage formal commands, the processor 200 can use the formal method to find the second part of the detection nodes Td. At this time, the processor 200 may choose to perform step S306 first, and adjust the circuit design data Dc according to the second part of the detection nodes.

As mentioned above, in order to reduce calculation, when performing step S304, the processor 200 can only verify the first part of the detection nodes Td by the formal method, so as to find the second part of the detection nodes. In other words, the second-stage property commands D2 correspond to the first part of the detection nodes, and the second part of the detection nodes is found from the first part.

In step S305, the processor 200 further using the formal method to find a third part of the detection nodes Td. "Third part" is a part of detection nodes with signal changes when signals of the control terminal Ta, the first input terminal T1 and the second input terminal T2 (i.e., signal of the hierarchy port) do not change. The third part of the detection nodes also belongs to unstable nodes.

Specifically, when finding the third part of the detection nodes Td, first inputting multiple third-stage property commands D3 to the processor 200 to generate multiple third-stage formal commands. Each third-stage property command D3 corresponds to one detection node, and is configured to verify whether signal of the detection nodes Td remains stable when signal of the control terminal Ta of the logic circuits 110, signal of the first input terminal T1 and signal of the second input terminal T2 do not change. Next, according to the third-stage formal commands, the processor 200 uses the formal method to find the third part of the detection nodes Td.

As mentioned above, in order to reduce calculation, when performing step S305, the processor 200 can only verify the second part in the detection nodes Td by the formal method, so as to find the third part of the detection nodes. In other words, the third-stage property commands D3 correspond to the second part of the detection nodes, and the third part of the detection nodes is found from the second part.

The above steps S304, S305 are configured to verify whether signal of the detection nodes Td changes due to the influence of the first input terminal T1 and the second input terminal T2. In some other embodiments, the performing order of the above steps S304 and S305 can be reversed. That is, the processor 200 can first verify whether the detection nodes Td will be affected by the second input terminal T2, then verify whether the detection nodes Td will be affected by the first input terminal T1. In other words, the first input terminal T1 and the second input terminal T2 are defined as one of them is connected to the black box output circuit and the other is connected to the hierarchy port of the circuit to be identified 100.

After verification in steps S303-S305, the found third part of the detection nodes Td is/are node that signal is not constant and does not change according to signal of the control terminal T1, the first input terminal T2 and the second input terminal T2. In other words, the third part of the detection nodes Td is changed according to the signal of the third input terminal T3. Therefore, the third part of the detection nodes Td can be set as the node that needs to be adjusted first. In step S306, the processor 200 adjusts/correcting the circuit design data Dc according to the third part of the detection nodes Td.

Figure 4B:
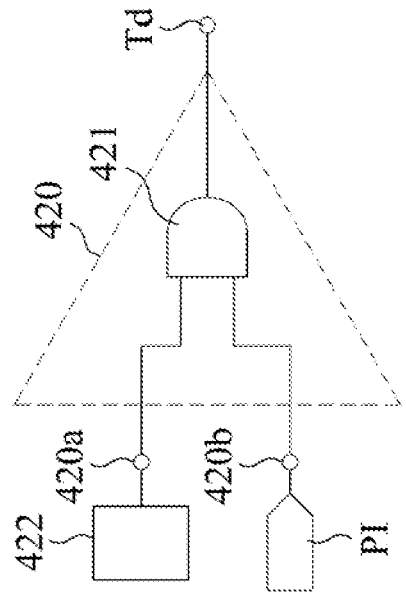
FIG. 4A and FIG. 4B are schematic diagrams of the circuit to be identified in some embodiments of the present disclosure.
Figure 4A:
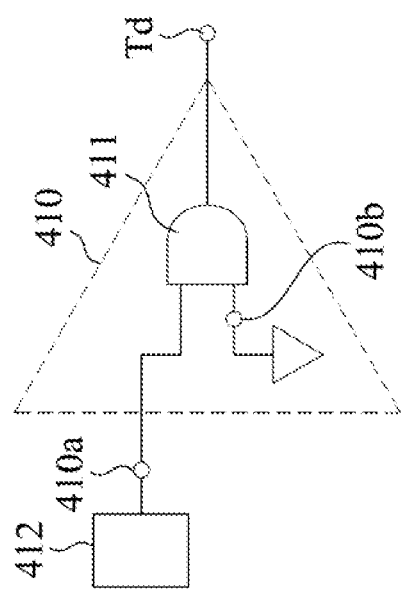

The following examples illustrate the "constant value (stuck)" and "unstable" of the detection nodes Td. FIG. 4A and FIG. 4B are schematic diagrams of the circuit to be identified in some embodiments of the present disclosure. As shown in FIG. 4A, the logic circuit 410 connects to the control terminal 410*a* and the input terminals 410*b* by an AND gate circuit 411. The control terminal 410*a* is the output terminal of the register circuits 412, and the input terminals 410*b* is ground. In this case, the output result of the AND gate circuit 411 will always be "0" without being controlled by the control terminal 410*a*, so the detection node of the output terminal of the logic circuits 410 will belong to a "stuck node".

As shown in FIG. 4B, the logic circuit 420 connects to a control terminal 420*a* and an input terminals 420*b* through the AND gate circuit 421. The control terminal 420*a* is a register 422, and the input terminal 420*b* is connected to the hierarchy port PI. In this case, the output result of the AND gate circuit 411 will be simultaneously affected by the control terminal 420*a* and the input terminals 420*b*, but not completely controlled by the control terminal 420*a*. Therefore, the detection node Td of the output terminal of the logic circuits 420 belongs to "unstable node".

FIG. 4A and FIG. 4B are only schematic diagrams of some embodiments of the logic circuits. The internal circuits of the logic circuits are far more complicated than the structures shown in FIG. 4A and FIG. 4B, so it is necessary to use the formal method to verify the stability of the detection nodes.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A circuit verification method, comprising:
    inputting a circuit design data to a processor, wherein the circuit design data comprises a plurality of logic circuits and a plurality of detection nodes, each of the plurality of logic circuit includes a control terminal and a plurality of input terminals, and is configured to output a signal to one of the plurality of detection nodes;
    inputting a plurality of first-stage property commands to the processor to generate a plurality of first-stage formal commands conforming a formal method, wherein the plurality of first-stage property commands corresponds to the plurality of detection nodes, and is configured to verify whether signals of the plurality of detection nodes remain stable when a signal of the control terminal of each of the plurality of logic circuits does not changed;
    finding a first part of the plurality of detection nodes by the formal method according to the first-stage formal commands; and
    finding a second part of the plurality of detection nodes by the formal method, wherein the second part comprises a part of the plurality of detection nodes with signal changes when signals of the control terminal and a first input terminal of the plurality of input terminals do not change.

2. The circuit verification method of claim 1, wherein the plurality of logic circuits connects to a plurality of register circuits by the control terminal and the plurality of detection nodes, and the plurality of logic circuits do not comprise any register elements.

3. The circuit verification method of claim 1, wherein finding the second part of the plurality of detection nodes by the formal method comprises:
    inputting a plurality of second-stage property commands to the processor to generate a plurality of second-stage formal commands, wherein the plurality of second-stage property commands corresponds to the plurality of detection nodes, and is configured to verify whether the plurality of detection nodes remain stable when the signals of the control terminal and the first input terminal do not changed; and
    finding the second part of the plurality of detection nodes according to the plurality of second-stage formal commands.

4. The circuit verification method of claim 3, wherein the plurality of second-stage property commands corresponds to the first part of the plurality of detection nodes, and the second part of the plurality of detection nodes is found from the first part.

5. The circuit verification method of claim 4, further comprising:
    inputting a plurality of third-stage property commands to the processor to generate a plurality of third-stage formal commands, wherein the plurality of third-stage property commands corresponds to the plurality of detection nodes, and is configured to verify whether the plurality of detection nodes remain stable when signals of the control terminal, the first input terminal and a second input terminal do not changed.

6. The circuit verification method of claim 5, wherein the plurality of third-stage property commands corresponds to the second part of the plurality of detection nodes, and a third part of the plurality of detection nodes is found from the second part.

7. The circuit verification method of claim 5, wherein each of the plurality of logic circuits is a part of a circuit to be identified, and the first input terminal or the second input terminal is configured to connect to a hierarchy port of the circuit to be identified.

8. The circuit verification method of claim 5, wherein each of the plurality of logic circuits is a part of a circuit to be identified, the plurality of input terminals further comprises a third input terminal, and the third input terminal is a floating node.

9. The circuit verification method of claim 1, further comprising:
inputting a plurality of non-stuck-at check commands to the processor to generate a plurality of formal check commands conforming the formal method, wherein the plurality of non-stuck-at check commands corresponds to the plurality of detection nodes, and is configured to verify whether the signals of the plurality of detection nodes comprises at least one signal change;
finding a plurality of stuck nodes of the plurality of detection nodes by the formal method according to the plurality of formal check commands; and
adjusting the circuit design data according to the plurality of stuck nodes.

10. The circuit verification method of claim 1, wherein each of the plurality of logic circuits is a part of a memory circuit.

11. A circuit verification method, comprising:
inputting a circuit design data to a processor, wherein the circuit design data comprises a plurality of logic circuits and a plurality of detection nodes, each of the plurality of logic circuit includes a control terminal and a plurality of input terminals, and is configured to output a signal to one of the plurality of detection nodes;
using, by the processor, a formal method to find a plurality of stuck nodes of the plurality of detection nodes where signals remains constant; and
using, by the processor, the formal method to find a first part of the plurality of detection nodes, wherein the first part comprises a part of the plurality of detection nodes with signal changes when a signal of the control terminal does not change.

12. The circuit verification method of claim 11, wherein the plurality of logic circuits connects to a plurality of register circuits by the control terminal and the plurality of detection nodes, and the plurality of logic circuits do not comprise any register elements.

13. The circuit verification method of claim 11, further comprising:
using, by the processor, the formal method to find a second part of the plurality of detection nodes, wherein the second part comprises a part of the plurality of detection nodes with signal changes when signals of the control terminal and a first input terminal of the plurality of input terminals does not change.

14. The circuit verification method of claim 13, wherein the processor is configured to verify the first part of the plurality of detection nodes by the formal method to find the second part of the plurality of detection nodes.

15. The circuit verification method of claim 14, further comprising:
using, by the processor, the formal method to find a third part of the plurality of detection nodes, wherein the third part comprises a part of the plurality of detection nodes with signal changes when signals of the control terminal, the first input terminal and a second input terminal does not changed.

16. The circuit verification method of claim 15, wherein the processor is configured to verify the second part of the plurality of detection nodes by the formal method to find the third part of the plurality of detection nodes.

17. The circuit verification method of claim 15, wherein each of the plurality of logic circuits is a part of a circuit to be identified, and the first input terminal or the second input terminal is configured to connect to a hierarchy port of the circuit to be identified.

18. The circuit verification method of claim 15, wherein each of the plurality of logic circuits is a part of a circuit to be identified, the plurality of input terminals further comprises a third input terminal, and the third input terminal is a floating node.

19. The circuit verification method of claim 11, wherein using the formal method to find the plurality of stuck nodes of the plurality of detection nodes where signals remains constant comprises:
inputting a plurality of non-stuck-at check commands to the processor to generate a plurality of formal check commands, wherein the plurality of non-stuck-at check commands corresponds to the plurality of detection nodes, and is configured to verify whether signals of the plurality of detection nodes comprises at least one signal change; and
finding the plurality of stuck nodes of the plurality of detection nodes by the formal method according to the plurality of formal check commands.

20. The circuit verification method of claim 11, wherein each of the plurality of logic circuits is a part of a memory circuit.

* * * * *